US009461721B2

United States Patent
Seo et al.

(10) Patent No.: US 9,461,721 B2
(45) Date of Patent: Oct. 4, 2016

(54) METHOD FOR REPORTING CHANNEL STATE INFORMATION ON A COORDINATED MULTI-POINT TRANSMISSION AND RECEPTION AGGREGATION, AND APPARATUS THEREFOR

(71) Applicant: LG ELECTRONICS INC., Seoul (KR)

(72) Inventors: Hanbyul Seo, Anyang-si (KR); Kijun Kim, Anyang-si (KR); Hyungtae Kim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 148 days.

(21) Appl. No.: 14/351,026

(22) PCT Filed: Oct. 25, 2012

(86) PCT No.: PCT/KR2012/008796
§ 371 (c)(1),
(2) Date: Apr. 10, 2014

(87) PCT Pub. No.: WO2013/062326
PCT Pub. Date: May 2, 2013

(65) Prior Publication Data
US 2014/0254708 A1 Sep. 11, 2014

Related U.S. Application Data

(60) Provisional application No. 61/552,447, filed on Oct. 27, 2011.

(51) Int. Cl.
*H04B 7/06* (2006.01)
*H04B 7/04* (2006.01)
*H04J 11/00* (2006.01)

(52) U.S. Cl.
CPC .......... *H04B 7/0417* (2013.01); *H04B 7/0456* (2013.01); *H04B 7/063* (2013.01); *H04B 7/0626* (2013.01); *H04B 7/0632* (2013.01); *H04J 11/0053* (2013.01)

(58) Field of Classification Search
CPC . H04J 11/0053; H04B 7/0417; H04B 7/063; H04B 7/0632; H04B 7/0456; H04B 7/0626
See application file for complete search history.

(56) References Cited

U.S. PATENT DOCUMENTS

2010/0027456 A1\* 2/2010 Onggosanusi ......... H04B 7/024
370/312
2012/0140694 A1 6/2012 Sun et al.
(Continued)

FOREIGN PATENT DOCUMENTS

KR 10-2010-0012897 A 2/2010
WO WO 2011/017968 A1 2/2011
WO WO 2011/094633 A2 8/2011

OTHER PUBLICATIONS

NTT DOCOMO, "Views on Scalable CSI Feedback for DL CoMP in LTE-Advanced," 3GPP TSG RAN WG1 Meeting #58bis, R1-094243, Miyazaki, Japan, Oct. 12-16, 2009, pp. 1-5.
(Continued)

*Primary Examiner* — Redentor Pasia
*Assistant Examiner* — Peter Mak
(74) *Attorney, Agent, or Firm* — Birch, Stewart, Kolasch & Birch, LLP

(57) ABSTRACT

According to one embodiment of the present invention, a method is disclosed in which user equipment (UE) that communicates with a coordinated multi-point transmission and reception (CoMP) aggregation transmits channel state information (CSI) on said CoMP aggregation in a wireless communication system. The method may enable the determination of the number of bits for inter-point phase information for points that belong to said CoMP aggregation, and the number of bits for a channel quality indicator (CQI) for said CoMP aggregation based on rank indicator (RI) information within the number of bits allocated for transmission of the channel state information, and may enable the transmission of the channel state information including the inter-point phase information and CQI on the CoMP aggregation to at least one of a plurality of points that belong to the CoMP aggregation in accordance with said determined number of bits.

16 Claims, 8 Drawing Sheets

(56) References Cited

U.S. PATENT DOCUMENTS

2012/0250549 A1* 10/2012 Lee .................. H04L 5/0007
370/252
2013/0003788 A1* 1/2013 Marinier ................ H04B 7/024
375/219
2013/0039236 A1 2/2013 Malladi

OTHER PUBLICATIONS

Qualcomm Europe, "TP for feedback in support of DL CoMP for LTE-A TR," 3GPP TSG-RAN WG1 #57, R1-092284, San Francisco, California, USA, May 4-8, 2009, pp. 1-4.

* cited by examiner

METHOD FOR REPORTING CHANNEL STATE INFORMATION ON A COORDINATED MULTI-POINT TRANSMISSION AND RECEPTION AGGREGATION, AND APPARATUS THEREFOR

CROSS REFERENCE TO RELATED APPLICATIONS

This application is the National Phase of PCT/KR2012/008796 filed on Oct. 25, 2012, which claims priority under 35 U.S.C. §119(e) to U.S. Provisional Application No. 61/552,447 filed on Oct. 27, 2011, all of which are hereby expressly incorporated by reference into the present application.

TECHNICAL FIELD

The present invention relates to a wireless communication system and, more particularly, to a method and apparatus for transmitting or receiving channel state information in a system supporting coordinated multi-point transmission and reception (CoMP).

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-eNB cooperation technology, etc. for raising data capacity transmitted on limited frequency resources have been developed.

Among these, a CoMP scheme has been proposed for system performance enhancement of a wireless communication system. CoMP is expected to increase cell-edge UE performance and enhance average sector throughput. However, even when the CoMP scheme is applied, there is still inter-cell interference (ICI) that reduces cell-edge UE performance and this leads to an issue for channel estimation of a user equipment (UE) to which a communication service is provided through the CoMP scheme.

DETAILED DESCRIPTION OF THE INVENTION

Technical Problems

To maximize efficiency of a transmission and reception scheme such as CoMP, a channel state formed between a base station (BS) and a UE needs to be accurately estimated. However, up to now, a method for deriving channel state information for a wireless communication system providing a CoMP service has not been defined.

The technical objects that can be achieved through the present invention are not limited to what has been particularly described hereinabove and other technical objects not described herein will be more clearly understood by persons skilled in the art from the following detailed description.

Technical Solutions

According to an embodiment of the present invention, provided herein is a method for transmitting channel state information (CSI) for a coordinated multi-point transmission and reception (CoMP) set by a user equipment (UE) communicating with the CoMP set in a wireless communication system, including determining the number of bits for phase information between points (inter-point phase information) belonging to the CoMP set and the number of bits for a channel quality indicator (CQI) for the CoMP set, based on rank indicator (RI) information within the number of bits allocated for transmission of the CSI, and transmitting the CSI including the inter-point phase information and the CQI for the CoMP set to at least one of the points belonging to the CoMP set according to the determined numbers of bits.

Preferably, the RI information may include an RI for the CoMP set and an RI for each of the points belonging to the CoMP set.

Preferably, the method may include transmitting a precoding matrix indicator (PMI) for the CoMP set to at least one of the points belonging to the CoMP set.

Preferably, when an RI for the CoMP set is the same as an RI for each of the points of the CoMP set, the method may include deriving a PMI for the CoMP set by concatenating PMIs for each of the points of the CoMP set.

Preferably, when an RI for the CoMP is greater than an RI for each of the points of the CoMP set, the method may include padding a zero vector to a PMI for each of the points of the CoMP set and acquiring the PMI for the CoMP set by concatenating the PMI to which the zero vector is padded.

Preferably, when the zero vector is padded, the number of bits for the inter-point phase information may be set to zero.

Preferably, when an RI value for the CoMP set is 2 or more, the number of bits for the inter-point phase information may be set to zero.

In another embodiment of the present invention, provided herein is a method for receiving channel state information (CSI) for a coordinated multi-point transmission and reception (CoMP) set from a user equipment (UE) in a wireless communication system, including receiving phase information between points (inter-point phase information) belonging to the CoMP set and a channel quality indicator (CQI) for the CoMP set, the inter-point phase information having the first number of bits and the CQI having the second number of bits, determined based on rank indicator (RI) information within the number of bits allocated for transmission of the CSI, wherein the RI information includes an RI for the CoMP set and an RI for each of the points belonging to the CoMP set.

In another embodiment of the present invention, provided herein is a user equipment (UE) for communicating with a coordinated multi-point transmission and reception (CoMP) set and transmitting channel state information (CSI) for the CoMP set in a wireless communication system, including a radio frequency (RF) unit configured to transmit or receive a radio signal; and a processor configured to control the RF unit, wherein the processor determines the number of bits for phase information between points (inter-point phase information) belonging to the CoMP set and the number of bits for a channel quality indicator (CQI) for the CoMP set, based on rank indicator (RI) information within the number of bits allocated for transmission of the CSI, and transmits the CSI including the inter-point phase information and the CQI for the CoMP set to at least one of the points belonging to the CoMP set according to the determined numbers of bits.

Preferably, the RI information may include an RI for the CoMP set and an RI for each of the points belonging to the CoMP set.

Preferably, the processor may be configured to transmit a precoding matrix indicator (PMI) for the CoMP set to at least one of the points belonging to the CoMP set.

Preferably, the processor may be configured to derive a precoding matrix index (PMI) for the CoMP set by concatenating a PMI for each of the points of the CoMP set, when an RI for the CoMP set is the same as an RI for each of the points of the CoMP set.

Preferably, the processor may be configured to pad a zero vector to a PMI for each of the points of the CoMP set and derive a PMI for the CoMP set by concatenating the PMI to which the zero vector is padded, when an RI for the CoMP is greater than an RI for each of the points of the CoMP set.

Preferably, the processor may be configured to set the number of bits for the inter-point phase information to zero, when the zero vector is padded.

Preferably, when an RI value for the CoMP set is 2 or more, the processor may be configured to set the number of bits for the inter-point phase information to zero.

In another embodiment of the present invention, provided herein is a base station (BS) for receiving channel state information (CSI) for a coordinated multi-point transmission and reception (CoMP) set from a user equipment (UE) in a wireless communication system, including a radio frequency (RF) unit configured to transmit or receive a radio signal; and a processor configured to control the RF unit, wherein the processor receives phase information between points (inter-point phase information) belonging to the CoMP set and a channel quality indicator (CQI) for the CoMP set, the inter-point phase information having the first number of bits and the CQI having the second number of bits, determined based on rank indicator (RI) information within the number of bits allocated for transmission of the CSI, and wherein the RI information includes an RI for the CoMP set and an RI for each of the points belonging to the CoMP set.

The above technical solutions are merely some parts of the embodiments of the present invention and various embodiments into which the technical features of the present invention are incorporated can be derived and understood by persons skilled in the art from the following detailed description of the present invention.

Advantageous Effects

According to an embodiment of the present invention, channel state information for a CoMP operation can be efficiently performed.

DESCRIPTION OF DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Figure 1:
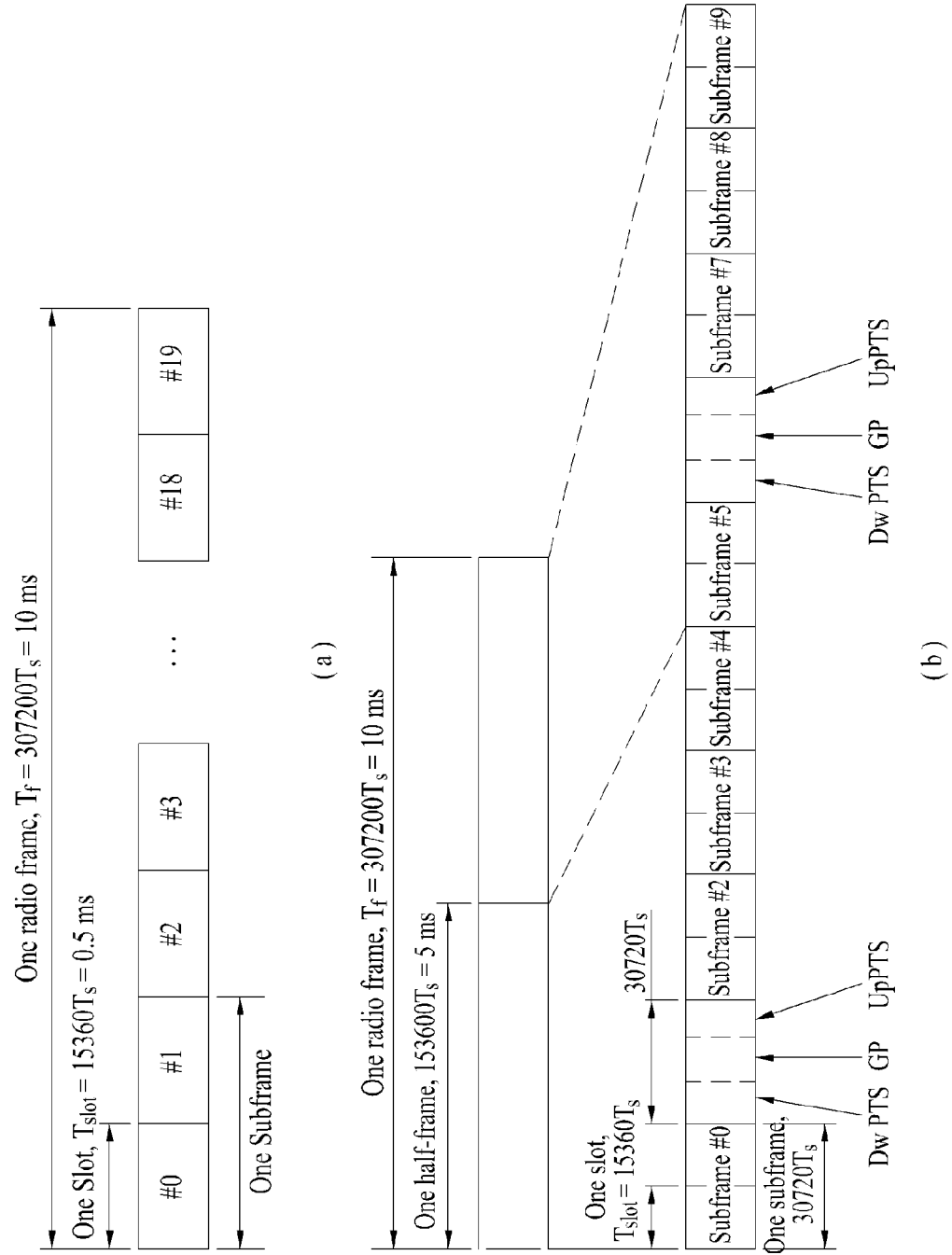
FIG. 1 illustrates an exemplary radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

Also, technique, device, system, which will be described hereinafter, may be applied to various wireless multiplexing access systems. For convenience of description, it is assumed that the present invention is applied to a 3GPP LTE(-A). However, it is to be understood that technical features of the present invention are limited to the 3GPP LTE(-A). For example, although the following description will be made based on a mobile communication system corresponding to a 3GPP LTE(-A) system, the following description may be applied to other random mobile communication system except matters specific to the 3GPP LTE(-A).

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/ random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

Also, in the present invention, Cell-specific Reference Signal (CRS)/Demodulation Reference Signal (DMRS)/Channel State Information Reference Signal (CSI-RS) time-frequency resources (or REs) respectively mean REs that may be allocated or used for CRS/DMRS/CSI-RS, or time-frequency resources (or REs) carrying CRS/DMRS/CSI-RS. Also, subcarriers that include CRS/DMRS/CSI-RS RE may be referred to as CRS/DMRS/CSI-RS subcarriers, and OFDM symbols that include CRS/DMRS/CSI-RS RE may be referred to as CRS/DMRS/CSI-RS symbols. Also, in the present invention, SRS time-frequency resources (or REs) may mean time-frequency resources (or REs) transmitted from the user equipment to the base station to allow the base station to carry a sounding reference signal (SRS) used for measurement of an uplink channel status formed between the user equipment and the base station. The reference signal (RS) means a signal of a special waveform previously defined and known well by the user equipment and the base station, and may be referred to as a pilot.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Figure 2:
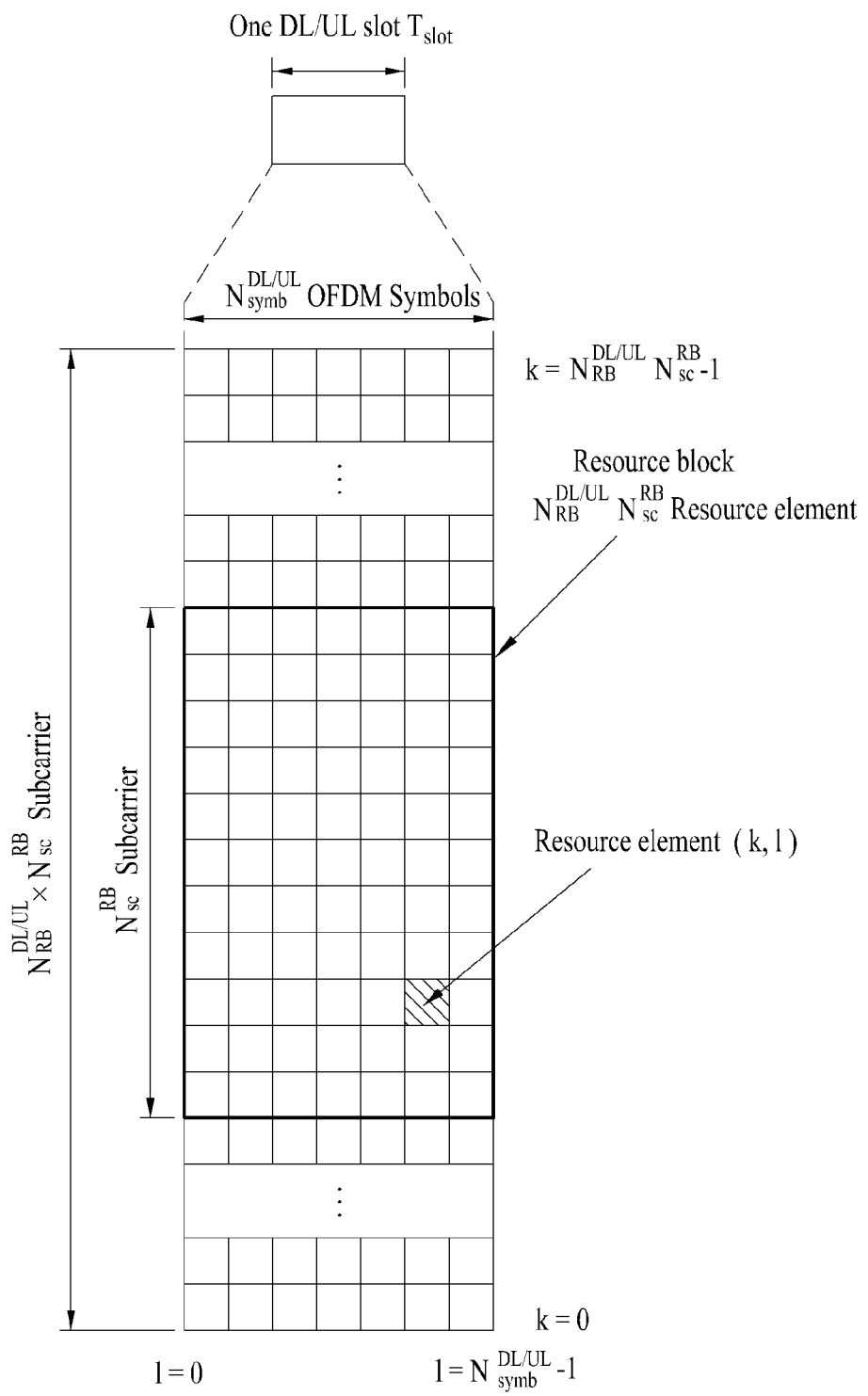
FIG. 2 illustrates an exemplary downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{UL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to NDLVRB−1, and NDLVRB=NDLRB is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
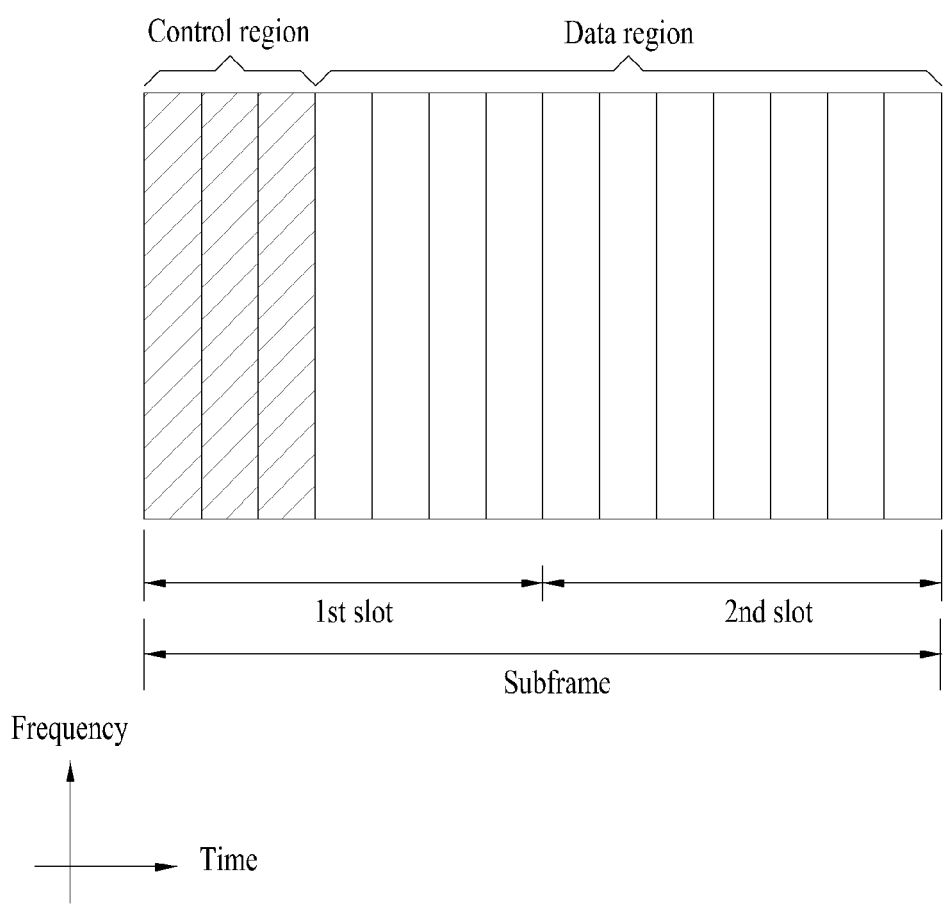
FIG. 3 illustrates an exemplary DL subframe structure used in a 3GPP LTE(-A) system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP) etc. A size and purpose of the DCI carried by one PDCCH varies according to DCI format, and the size varies according to a coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked with an identifier (e.g., a Radio Network Temporary Identifier (RNTI)) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to nine REGs and one REG corresponds to four REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (that is, a PCFICH and a PHICH). A DCI format and the number of DCI bits are determined according to the number of CCEs.

CCEs are numbered and consecutively used and, in order to simplify decoding, a PDCCH having a format composed of n CCEs may start from only a CCE having a number corresponding to a multiple of n. The number of CCEs used to transmit a specific PDCCH, that is, a CCE aggregation level, is determined by a BS according to a channel state. For example, in case of a PDCCH for a UE having a good DL channel (e.g., a UE adjacent to a BS), one CCE may be sufficient. However, in case of a PDCCH for a UE having a bad channel (e.g., a UE located at a cell edge), 8 CCEs are required to obtain sufficient robustness.

Figure 4:
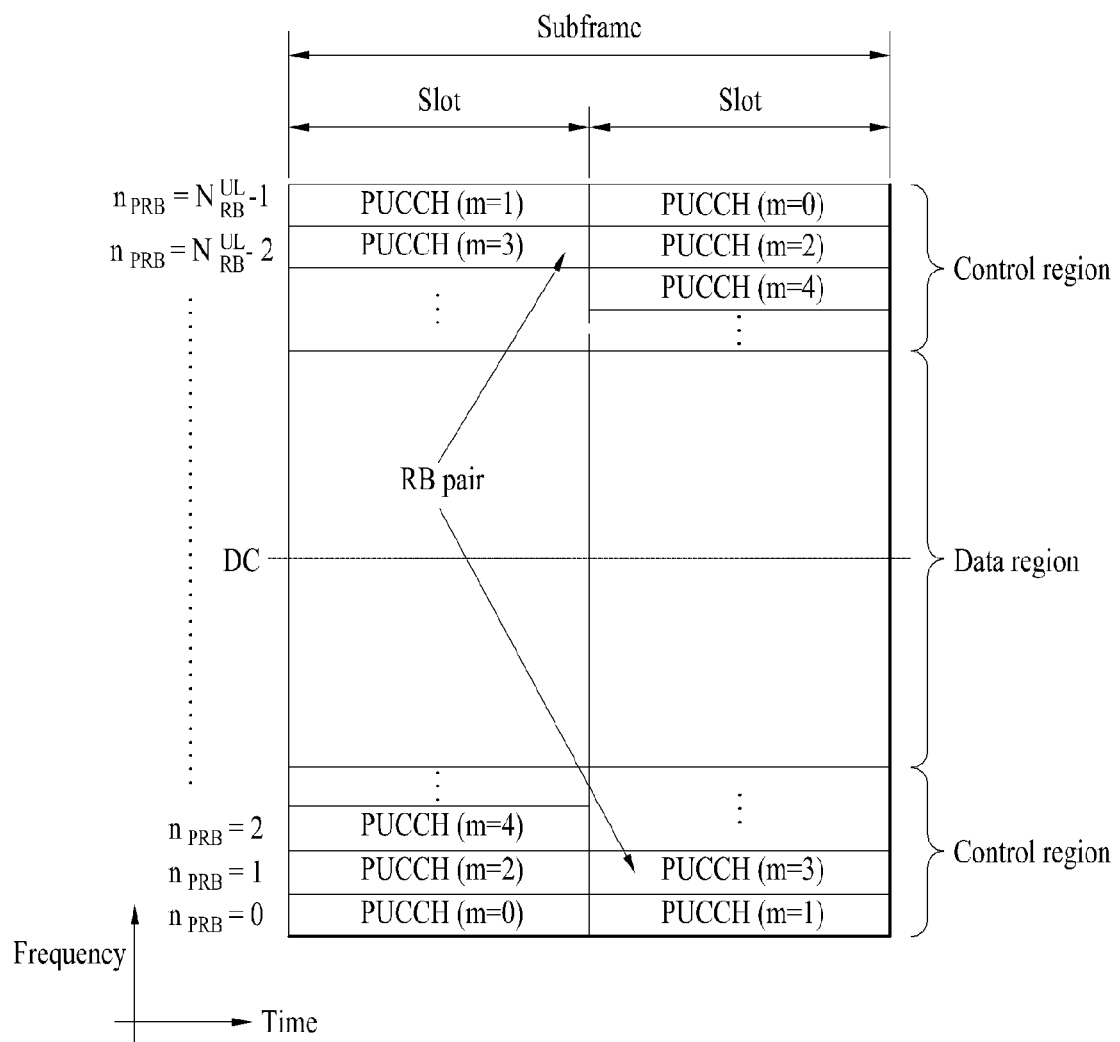
FIG. 4 illustrates an exemplary UL subframe structure used in a 3GPP LTE(-A) system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data. The control region and the data region in the UL subframe are also referred to as a PUCCH region and a PUSCH region, respectively. A sounding reference signal (SRS) may be allocated to the data region. The SRS is transmitted on a last OFDM symbol of a UL subframe in a time domain and is transmitted on a data transmission band, that is, a data region, of the UL subframe. SRSs of several UEs, which are transmitted/received on the last OFDM symbol of the same subframe, are distinguished according to frequency location/sequence.

If a UE employs an SC-FDMA scheme in UL transmission, in order to maintain a single carrier property, in a 3GPP LTE release-8 or release-9 system, a PUCCH and a PUSCH may not be simultaneously transmitted on one carrier. In a 3GPP LTE release-10 system, support of simultaneous transmission of a PUCCH and a PUSCH may be indicated by a higher layer.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The size and usage of UCI carried by one PUCCH may be changed according to PUCCH format and the size of the UCI may be changed according to a coding rate. For example, the following PUCCH format may be defined.

TABLE 2

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

Meanwhile, in an LTE-A system which includes more accurate MU-MIMO and explicit CoMP operations, current CSI feedback is defined in LTE and thus may not sufficiently support operations to be newly introduced. As requirements for CSI feedback accuracy become more complex in order to obtain sufficient MU-MIMO or CoMP throughput gain, the PMI is composed of two PMIs such as a long term/wideband PMI (W1) and a short term/subband PMI (W2). In other words, a final PMI is expressed by a function of W1 and W2. For example, the final PMI W may be defined as follows: W=W1*W2 or W=W2*W1. Accordingly, in LTE-A, a CSI may be composed of RI, W1, W2 and CQI.

In the 3GPP LTE(-A) system, an uplink channel used for CSI transmission is shown in Table 3 below.

TABLE 3

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 3, the CSI may be transmitted using a physical uplink control channel (PUCCH) with periodicity determined by a higher layer or may be aperiodically transmitted using a physical uplink shared channel (PUSCH) according to the demand of a scheduler. If the CSI is transmitted using the PUSCH, only frequency selective scheduling method and an aperiodic CSI transmission method are possible. Hereinafter, the scheduling scheme and a CSI transmission scheme according to periodicity will be described.

1) CQI/PMI/RI Transmission Via PUSCH after Receiving CSI Transmission Request Control Signal.

A control signal for requesting transmission of a CSI may be included in a PUSCH scheduling control signal (UL grant) transmitted via a PDCCH signal. Table 4 below shows the mode of the UE when the CQI, the PMI and the RI are transmitted via the PUSCH.

TABLE 4

| | | PMI feedback type | | |
|---|---|---|---|---|
| | | No PMI | Single PMI | Multiple PMIs |
| PUSCH CQI feedback type | Wideband (wideband CQI) | | | Mode 1-2 |
| | UE selection (subband CQI) | Mode 2-0 | | Mode 2-2 |
| | Higher layer configuration (subband CQI) | Mode 3-0 | Mode 3-1 | |

The transmission mode of Table 4 is selected at a higher layer and the CQI/PMI/RI is transmitted in the same PUSCH subframe. Hereinafter, an uplink transmission method of the UE according to mode will be described.

Mode 1-2 indicates the case in which a precoding matrix is selected on the assumption that data is transmitted via only a subband with respect to each subband. The UE generates a CQI on the assumption that a precoding matrix is selected with respect to an entire set S specified by a higher layer or a system bandwidth. In Mode 1-2, the UE may transmit the CQI and the PMI value of each subband. At this time, the size of each subband may be changed according to system bandwidth.

In mode 2-0, the UE may select M preferred subbands with respect to the set S specified at the higher layer or the system bandwidth. The UE may generate one CQI value on the assumption that data is transmitted with respect to the selected M subbands. The UE preferably reports one CQI (wideband CQI) value with respect to the set S or the system bandwidth. The UE defines the CQI value of each codeword in the form of a difference if a plurality of codewords is present with respect to the selected M subbands.

At this time, the differential CQI value is determined by a difference between an index corresponding to the CQI value of the selected M subbands and a wideband CQI (WB-CQI) index.

In Mode 2-0, the UE may transmit a CQI value generated with respect to a specified set S or an entire set and one CQI value for the selected M subbands to the BS. At this time, the size of the subband and the M value may be changed according to system bandwidth.

In Mode 2-2, the UE may simultaneously select the locations of M preferred subbands and a single precoding matrix for the M preferred subbands on the assumption that data is transmitted via the M preferred subbands. At this time, the CQI value for the M preferred subbands is defined per codeword. In addition, the UE further generates a wideband CQI value with respect to the specified set S or the system bandwidth.

In Mode 2-2, the UE may transmit information about the locations of the M preferred subbands, one CQI value for the selected M subbands, a single PMI for the M preferred subbands, a wideband PMI and a wideband CQI value to the BS. At this time, the size of the subband and the M value may be changed according to system bandwidth.

In Mode 3-0, the UE generates a wideband CQI value. The UE generates the CQI value for each subband on the assumption that data is transmitted via each subband. At this time, even in case of RI>1, the CQI value indicates only the CQI value for a first codeword.

In Mode 3-1, the UE generates a single precoding matrix with respect to the specified set S or the system bandwidth. The UE generates a subband CQI on a per codeword basis on the assumption of the single precoding matrix generated with respect to each subband. In addition, the UE may generate a wideband CQI on the assumption of a single precoding matrix. The CQI value of each subband may be expressed in the form of a difference. The subband CQI value is calculated by a difference between a subband CQI index and a wideband CQI index. At this time, the size of the subband may be changed according to system bandwidth.

2) Periodic CQI/PMI/RI Transmission Via PUCCH

The UE may periodically transmit the CSI (e.g., CQI/PMI/RI information) to the BS via the PUCCH. If the UE receives a control signal for requesting transmission of user data, the UE may transmit the CQI via the PUCCH. Even when the control signal is transmitted via the PUSCH, the CQI/PMI/RI may be transmitted using one of the modes defined in Table 5 below.

TABLE 5

| | | PMI feedback type | |
| --- | --- | --- | --- |
| | | No PMI | Single PMI |
| PUCCH CQI feedback type | Wideband (wideband CQI) | Mode 1-0 | Mode 1-1 |
| | UE selection (subband CQI) | Mode 2-0 | Mode 2-1 |

The UE may have the transmission modes shown in Table 5. Referring to Table 5, in Mode 2-0 and Mode 2-1, a bandwidth (BP) part is a set of subbands continuously located in a frequency domain and may cover a system bandwidth or a specified set S. In Table 5, the size of each subband, the size of the BP and the number of BPs may be changed according to system bandwidth. In addition, the UE transmits the CQI in a frequency domain in ascending order per BP so as to cover the system bandwidth or the specified set S.

According to a transmission combination of the CQI/PMI/RI, the UE may have the following four transmission types.
  i) Type 1: A subband CQI (SB-CQI) of Mode 2-0 and Mode 2-1 is transmitted.
  ii) Type 2: A wideband CQI and a PMI (WB-CQI/PMI) are transmitted.
  iii) Type 3: An RI is transmitted.
  iv) Type 4: A wideband CQI is transmitted.

If the UE transmits the RI and the wideband CQI/PMI, the CQI/PMI is transmitted in subframes having different offsets and periodicities. In addition, if the RI and the wideband CQI/PMI should be transmitted in the same subframe, the CQI/PMI is not transmitted.

In Table 5, the transmission periodicity of the wideband CQI/PMI and the subband CQI is P and has the following properties.
  The wideband CQI/PMI has periodicity of H*P. At this time, H=J*K+1, wherein J denotes the number of BPs and K denotes the number of periodicities of the BP. That is, the UE performs transmission at {0, H, 2H, . . . }
  The CQI is transmitted at a time of J*K rather than when the wideband CQI/PMI is transmitted.

In Table 5, the transmission periodicity of the RI is a multiple m of that of the wideband CQI/PMI and has the following properties.
  The offsets of the RI and the wideband CQI/PMI are 0 and, if the RI and the wideband CQI/PMI are transmitted in the same subframe, the wideband CQI/PMI is not transmitted.

Parameters P, H, K and O described in Table 5 are all determined at the higher layer of the UE and signaled to a physical layer of the UE.

Hereinafter, a feedback operation according to the mode of the UE will be described with reference to Table 5. If the UE is in Mode 1-0 and the RI is transmitted to the BS, the UE generates the RI with respect to the system bandwidth or the specified set S and transmits Type 3 report for transmitting the RI to the BS. If the UE transmits the CQI, the wideband CQI is transmitted.

If the UE is in Mode 1-1 and transmits the RI, the UE generates the RI with respect to the system bandwidth or the specified set S and transmits a Type 3 report for transmitting the RI to the BS. If the UE transmits the CQI/PMI, a single precoding matrix is selected in consideration of the recently transmitted RI. That is, the UE transmits a type 2 report composed of a wideband CQI, a single precoding matrix and a differential wideband CQI to the BS.

If the UE is in Mode 2-0 and transmits the RI, the UE generates the RI with respect to the system bandwidth or the specified set S and transmits a Type 3 report for transmitting the RI to the BS. If the UE transmits the wideband CQI, the UE generates the wideband CQI and transmits a Type 4 report to the BS on the assumption of the recently transmitted RI. If the UE transmits the CQI for the selected subband, the UE selects a most preferred subband with respect to J BPs composed of N subbands and transmits a Type 1 report to the BS. The type 1 report may be transmitted via one or more subframes according to the BP.

If the UE is in Mode 2-1 and transmits the RI, the UE generates the RI with respect to the system bandwidth or the specified set S and transmits a Type 3 report for transmitting the RI to the BS. If the UE transmits the wideband CQI to the BS, the UE generates the wideband CQI and transmits a Type 4 report to the BS in consideration of the recently transmitted RI. If the CQI for the selected subbands is transmitted, the UE generates a difference between a single CQI value for the selected subbands in the BP in consideration of the recently transmitted PMI/RI and a CQI of a codeword on the assumption that a single precoding matrix is used for the selected subbands and the recently transmitted RI if the RI is greater than 1 with respect to J BPs composed of Nj subbands and transmits a Type 1 report to the BS.

In addition to estimation (CSI reporting) of the channel state between the BS and the UE, for reduction of an interference signal and demodulation of a signal transmitted between the BS and the UE, various reference signals (RSs) are transmitted between the BS and the UE. The reference signal means a predefined signal having a special waveform, which is transmitted from the BS to the UE or from the UE to the BS and is known to the BS and the UE, and is also referred to as pilot. In 3GPP LTE release 8 (hereinafter, Rel-8), a cell specific reference signal (CRS) is proposed for the purpose of channel measurement of CQI feedback and demodulation of a physical downlink shared channel (PDSCH). However, after 3GPP LTE release 10 (hereinafter, Rel-10), separately from the CRS of Rel-8, a channel state information-reference signal (CSI-RS) for CSI feedback is proposed according to Rel-10.

Each BS may transmit a CSI-RS for channel measurement to the UE via a plurality of antenna ports and each UE may calculate channel state information based on the CSI-RS and transmit the channel state information to each BS in response thereto.

CoMP (Coordinated Multiple Point) Transmission and Reception Operation

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

Figure 5:
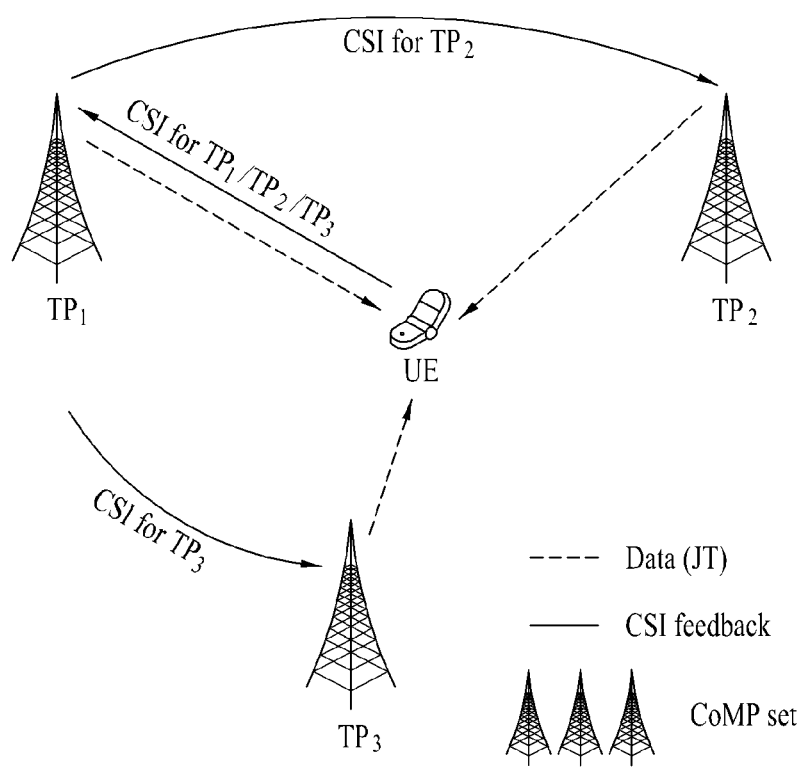
FIG. 5 illustrates an exemplary wireless communication system to which a CoMP scheme is applied.

FIG. 5 is a conceptual diagram illustrating a network structure for use in a CoMP (Coordinated Multiple Point) transmission and reception scheme according to one embodiment of the present invention. Although FIG. 5 shows three eNBs ($TP_1$, $TP_2$, $TP_3$), the scope or spirit of the present invention is not limited thereto and many more eNBs and many more UEs can also be present in the above network structure. The coordinated multiple transmission and reception set consisting a plurality of TPs is referred to as CoMP set. Meanwhile, the TP can be interchangeably referred to as BS (base station) and equivalent thereof. At least one or all TPs of CoMP set can participate in CoMP for one UE according to channel state. Here, each of the TPs can be equipped with a plurality of antennas.

Referring to FIG. 5, a plurality of TPs is arranged in the vicinity of a UE and the UE may be connected to first to third TPs, more specifically, to a plurality of antenna ports of the first to third TPs. The UE may report CSI for the plural antenna ports to a network. That is, the UE may transmit the CSI for the antenna ports to a BS that the UE accesses. The network performs scheduling for the UE based on the CSI.

FIG. 5 illustrates a wireless communication system in which the UE receives a joint transmission (JT) service from a CoMP set. In FIG. 5, the UE receives data from all TPs belonging to the CoMP set. Then, the UE may transmit CSI for all of the TPs belonging to the CoMP set. However, in a CoMP operation illustrated in FIG. 5, data transmission to the UE from each TP may cause mutual interference. For example, data transmission to the UE from TP1 may interfere with data transmission to the UE from TP2. Accordingly, since CSI for the TPs illustrated in FIG. 5 (CSI for TP1, CSI for TP2, and CSI for TP3) has not considered an influence of interference, accuracy of CSI for the CoMP set is lowered. In this environment, a new CSI calculation and transmission method for the CoMP set is needed.

Specifically, in the case of a JT service among CoMP operations, since multiple TPs cooperatively transmit the same data to a specific UE, a system providing the JT service may be regarded as a MIMO system in which antennas are geographically distributed in theory. In other words, even when MU-MIMO is performed in the JT service, CSI having a high level of accuracy is needed to avoid interference between co-scheduled UEs in the same manner as single-cell MU-MIMO. Even in the case of CoMP CB, accurate CSI is needed to avoid interference of a neighboring cell with a serving cell.

The present invention proposes a method for appropriately calculating a PMI and a CQI according to transmission rank and reporting the PMI and the CQI, when a UE calculates CSI and reports the CSI to a BS, for a CoMP operation. In an embodiment of the present invention, a situation is assumed in which the UE transmits CSI for a CoMP set including a total of N TPs on UL and the N TPs cooperatively transmit a DL signal to the UE, that is, a situation in which the UE and the TPs perform JT among CoMP operations. Generally, each TP has a separate CSI-RS pattern and the UE may perform channel estimation for CSI reporting through N CSI-RSs.

Figure 6:
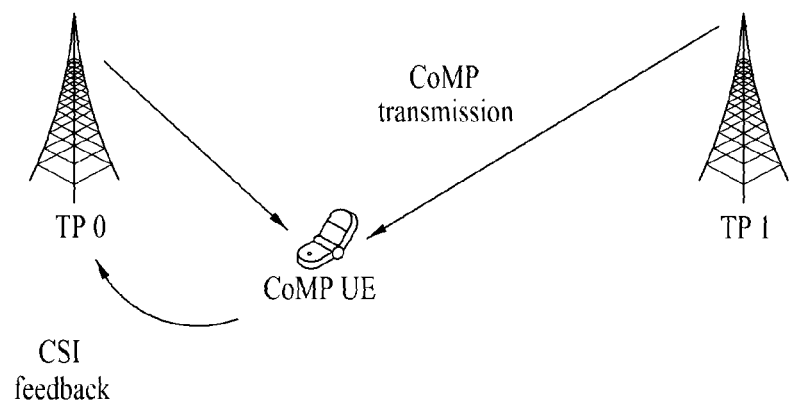
FIG. 6 illustrates an exemplary wireless communication system to which a CoMP scheme is applied according to an embodiment of the present invention.

FIG. 6 illustrates a simplified operation of a CoMP set for explaining an embodiment of the present invention. Specifically, in FIG. 6, N is 2.

In an embodiment associated with FIG. 6, a UE receives data from two TPs (TP0 and TP1) and a UE communicating with the two TPs (hereinafter, referred to as a 'CoMP UE' or 'UE') may report CSI to any one of the two TPs.

Although the UE reports CSI for the CoMP set, the UE communicating with the two TPs (hereinafter, referred to as the "CoMP UE" or "UE") may feed back per-point CSI for N TPs to each TP. The per-point CSI may denote some or all of an RI, a PMI, and a CQI for an individual TP. In addition, the per-point CSI may be CSI calculated under the assumption that each TP performs single point transmission without coordination or cooperation with other TPs. Alternatively, in order to exclude influence of interference from other TPs in the CoMP set, other points in the CoMP set may perform muting for setting a transmit power of a resource element (hereinafter, RE) on which a CSI-RS of a corresponding TP is transmitted to zero in a subframe configured to transmit the CSI-RS, in the case in which the per-point CSI is calculated. In this case, the CoMP UE may calculate CSI for a corresponding TP under the assumption that points other than the corresponding TP do not transmit data at all on an RE on which the corresponding TP transmits a CSI-RS. In this disclosure, an RI, a PMI, and a CQI of CSI calculated under the assumption that TP n performs single point transmission may be indicated by RI_n, PMI_n, and CQI_n, respectively.

Although CSI during CoMP transmission may be generally derived, to some degree, from a series of approximations using CSI calculated by assuming single point transmission, an error caused by approximation may occur. Specifically, when quantization for CSI for a single point is not dense, that is, as payload or the number of bits allocated to the CSI for a single point becomes small, an error caused by approximation increases and this may be a factor deteriorating overall performance of a CoMP operation. As a fundamental method for solving this problem, some or all of CSI for a CoMP set calculated under the assumption of CoMP transmission, particularly, JT, is reported, in addition to CSI for a single TP, to one of TPs or to a system. In this disclosure, an RI, a PMI, and a CQI for a CoMP set may be referred to as RI_c, PMI_c, and CQI_c, respectively. However, if all information corresponding to the CSI for the CoMP set is reported, much feedback overhead occurs and, thus, there are restrictions in efficiency.

Accordingly, the present invention proposes a method for reducing overhead of CSI feedback for a CoMP set and enabling more efficient feedback by maximally utilizing CSI for a single point, during reporting of the CSI for the CoMP set.

Case 1: When RI_c=1

Since a rank is 1 when a CoMP operation is performed, it is apparent that RI_n corresponding to a rank of single point transmission is 1. Accordingly, PMI_c for JT may be configured in the form of concatenating PMI_n corresponding to a PMI for each TP and it is desirable to additionally feed back inter-point or inter-TP phase information for correcting a phase difference between TPs. The inter-point or inter-TP phase information may refer to a phase difference value between TPs in each CoMP set and, in more detail, may be a phase difference value between points for the UE, derived from a phase value for each TP calculated by the UE from an RS (e.g. a CSI-RS) of each TP. For example, the inter-TP phase information may include the difference between a channel formed between TP_i and the UE and a channel formed between TP_j and the UE (where i=1, ..., n, j=1, ..., n, and i≠j). When phase information between TP0, which is a reference TP, and TPn is expressed as a_n, PMI_c may be indicated by the following Equation 1.

$$\text{PMI\_c} = [\text{PMI\_0}^T a\_1 * \text{PMI\_1}^T \ldots a\_(N-1) * \text{PMI\_}(N-1)^T]^T \quad \text{Equation 1}$$

Here, PMI_n is expressed as a 1×M_n vector, M_n corresponds to the number of antenna ports of a TP n, and PMI_c may be expressed as a 1×(M_0+M_1+ ... +M_(N−1)) vector. In addition, $V^T$ denotes a transpose vector of a vector V. For configuration of PMI_c, the UE may report phase information a_n between (N−1) TPs.

Moreover, the UE may calculate and report CQI_c achievable when PMI_c is used. If a rank for a CoMP set is 1, since one CQI only needs to be reported, CQI_c may be reported without significant increase in overhead. When CQI_c is derived from CQI_n in the case in which a rank for a CoMP set is 1, since an error is relatively small as compared with the case in which the rank is 2, reporting for CQI_c may be omitted if many bits are used to report the phase information a_n (i.e. payload or the number of bits for CQI_c may be set to zero).

Case 2: When RI_c=RI_n>1

Since a rank for a single TP is the same as a rank for a CoMP set, PMI_c may be acquired by concatenating PMI_n corresponding to a PMI for a single TP in a similar manner to the case of RI_c=1. For example, similarly to description in Equation 1, a matrix having a PMI vector per point as a column may be acquired. Even in this case, reporting should be performed per layer for accurate inter-TP phase information and this means that phase information between RI_c*(N−1) TPs should be fed back. In addition, since RI_c>1, if two codewords can be transmitted, a total of two CQIs_c, each for one of the two codewords, should be reported. Accordingly, in Case 2, overall CSI feedback overhead for the CoMP set is significantly increased. Particularly, since the amount of overhead is considerably increased as compared with Case 1, a method for reducing CSI feedback overhead for the CoMP set is needed.

To this end, payload or the number of bits allocated for inter-TP phase information can be reduced. Generally, as a transmission rank increases, the influence of selection for a precoder on communication performance is reduced. Therefore, when RI_c>1, accuracy of inter-TP phase information is less important as compared with the case when RI_c=1. In other words, since a high transmission rank means that a channel state is good, the influence of the inter-TP phase information on channel state reporting is reduced. Accordingly, it is proposed to reduce payload or the number of bits allocated for the inter-TP phase information when RI_c>1 as compared with that when RI_c=1.

For example, when RI_c=1, three bits are allocated for the inter-TP phase information and a_n is reported using 8PSK. On the other hand, when RI_c=2, two bits may be allocated for the inter-TP phase information to each of two ranks and a_n may be reported through up to 4 bits using QPSK, or one bit may be allocated for the inter-TP phase information to each of two ranks and a_n may be reported through up to two bits using BPSK. Alternatively, to further reduce overhead for CSI feedback, if RI_c becomes a threshold value (e.g. 2) or more, a_n may not be fed back by setting the payload and the number of bits for a_n to zero. If a_n is not reported, PMI_c may be derived from PMI_n under the assumption that a_n is a specific value such as 1.

Case 3: First Case in which RI_c>RI_n

In this case, single point transmission cannot obtain a high rank value due to strong correlation between antenna ports of an individual TP, whereas, if JT is performed from a plurality of geographically separated TPs, transmission of a high rank can be performed due to weak channel correlation.

Figure 7:
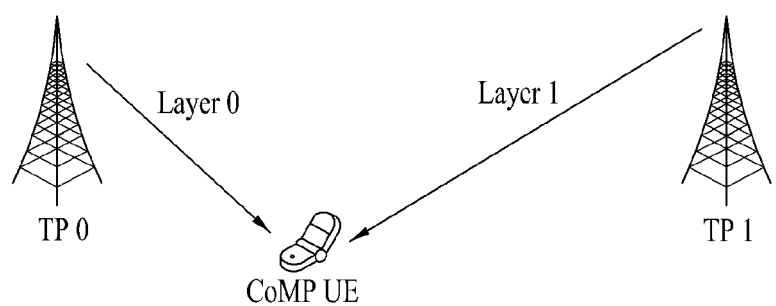
FIG. 7 illustrates an exemplary wireless communication system to which a CoMP scheme is applied according to an embodiment of the present invention.

FIG. 7 illustrates an example of a CoMP set in the case in which RI_0=RI_1=1 and RI_c=2 when N=2. Layer 0 is transmitted from TP 0 and layer 1 is transmitted from TP 1.

In the example related to FIG. 7, since rank for a single TP is not identical to a rank for a CoMP set, PMI_c cannot be acquired by simply concatenating PMI_n. In this case, PMI_c including a column of a number corresponding to RI_c can be obtained by padding a proper zero vector to each PMI_n. Since RI_0=RI_1=1 and RI_c=2, PMI_c can be acquired by Equations 2 and 3 indicated below.

$$PMI\_c(0)=[PMI\_0^T 0_{M\_1*1}]^T \quad \text{Equation 2}$$

$$PMI\_c(1)=[0_{M\_0*1} PMI\_1^T]^T \quad \text{Equation 3}$$

PMI_c(i) denotes a CoMP precoding vector for layer i, and $0_{M\_1*1}$ and $0_{M\_0*1}$ denote an M_1×1 zero-vector and an M_0×1 zero-vector, respectively. Accordingly, all of the PMI vectors of Equations 2 and 3 correspond to 1×(M_0+M_1) vectors.

In addition, the example illustrated in FIG. 7 may be more generalized. That is, a new PMI_n vector obtained by padding a proper zero vector to PMI_n is as indicated by Equation 4.

$$PMI\_n=[0_{p\_n*M\_n} PMI\_n 0_{q\_n*M\_n}] \quad \text{Equation 4}$$

Here, p_n and q_n are integers equal to or greater than 0 and correspond to the condition of p_n+q_n+RI_n=RI_c.

Thus, if PMI_c is configured by padding a zero vector, since an individual layer is transmitted from partial TPs, efficiency of inter-TP phase information is significantly degraded. Hence, a UE preferably uses a feedback resource remaining without reporting a_n to report CQI_c.

Case 4: Second Case in which RI_c>RI_n

As described in Case 3, if PMI_c is configured by a zero vector padding scheme when an optimal rank for a single TP is less than a rank for a CoMP set, since each TP participates in transmission of only partial layers, precoding performance may be deteriorated. To relieve this problem, a method for a UE to set RI_n to RI_c and report PMI_n even when an optical rank for a single TP is less than RI_c is proposed. In this case, since RI_n=RI_c, PMI_c can be obtained by concatenating PMI_n.

In other words, when CSI feedback for an individual TP is performed prior to CSI feedback for a CoMP set, RI_n may be configured by pre-considering a channel state of the CoMP set. That is, for instance, even when optimized RI_n for single point transmission is 1, if the UE can expect that optimal RI_c will be 2 in a channel state for the CoMP set, the UE may pre-set RI_n to 2 and report PMI_n according to RI_n.

In addition, although CQI_n for each TP may be reported based on PMI_n, a part of PMI_n is not preferred. Hence, if a network tries to perform single point transmission rather than CoMP set transmission, the UE is problematic in that operation should be performed based on CSI for a single TP which is not matched with an actual channel characteristic, especially, based on CQI_n.

In particular, in CQI_n for an individual TP, since RI_n=RI_c>1, CQI_n in which inter-layer interference is factored according to the CQI_n calculation scheme described in the above cases is reported and, thus, this is different from CQI_n in the case in which transmission of optimal rank 1 in single TP transmission is performed.

To solve this problem, Case 4 proposes that a UE report PMI_n by setting RI_n to RI_c and, during calculation of CQI_n, the UE calculate CQI_n achievable when performing transmission of rank 1 using each column vector of PMI_n and report the calculated CQI_n. As a similar scheme, an assumption that there is no inter-layer interference may be applied when the UE calculates CQI_n from PMI_n.

The following Table 6 exemplarily shows information about CSI for N=2 in the above-described Case 1, Case 2, and Case 3.

TABLE 6

| RI_0 | RI_1 | RI_c | number of bits for a_1 | number of bits for CQI_c | Total number of bits for CoMP CSI | Note |
|---|---|---|---|---|---|---|
| 1 | 1 | 1 | 3 | 4 | 7 | Case 1 |
| 2 | 2 | 2 | 0 | 7 | 7 | Case 2 (when inter-TP phase information is omitted) |

TABLE 6-continued

| RI_0 | RI_1 | RI_c | number of bits for a_1 | number of bits for CQI_c | Total number of bits for CoMP CSI | Note |
|---|---|---|---|---|---|---|
| 1 | 1 | 2 | 0 | 7 | 7 | Case 3 (when inter-TP phase information is omitted) |

As can be understood from the above Table 6, according to the embodiments of the present invention, since the number of bits is kept constant irrespective of which combination RI_c and RI_n form, a resource for CSI feedback can be more efficiently used. RI_c, RI_n, and the number of bits for RI_c and RI_n of Case 1 to Case 4 including Table 6 are all exemplary and do not restrict the range of the present invention. In addition, although the total number of bits for CoMP CSI in Table 6 is constant (i.e. 7 bits), this is purely exemplary and does not restrict the range of the present invention.

Furthermore, as illustrated in Table 6, it can be confirmed that the number of bits for phase information a_l and a CQI for a CoMP set is determined according to a combination of an RI (RI_0 or RI_1) for each TP and an RI (RI_c) for the CoMP set. In other words, the UE can be aware of the relationship between RI information (RI_0, RI_1, and RI_c), the phase information (a_1) for the CoMP set, and the number of bits for the CQI as shown in Table 6 by higher-layer signaling or by a rule determined between the UE and a BS (or system). The UE may obtain the RI information by measuring a channel state for the CoMP set and transmit the RI information to the BS. According to the present invention, the UE may determine the number of bits for the phase information and the CQI within the predetermined number of bits, according to the RI information. The UE may configure the CSI according to the determined number of bits and transmit the CSI to the BS. The BS may be aware of which bit combination will be transmitted for the CSI by the UE, based on the RI information received from the UE. For example, referring to Table 6, if the UE transmits RI information of RI_0=1, RI_1=1, and RI_c=1, the BS may be aware that the first 3 bits of 7-bit CSI transmitted by the UE are bits indicating and the other 4 bits are bits indicating CQI_c.

Additionally, an indicator indicating the relationship as shown in Table 6 may be transmitted on UL. For example, referring to Table 6, a combination corresponding to RI_0=2, RI_1=2, and RI_c=2 and bit allocation information (a_1, CQI_c, and the total number of bits) corresponding to the combination may be allocated as an indicator "1" and the indicator may be transmitted to the BS on UL.

Figure 8:
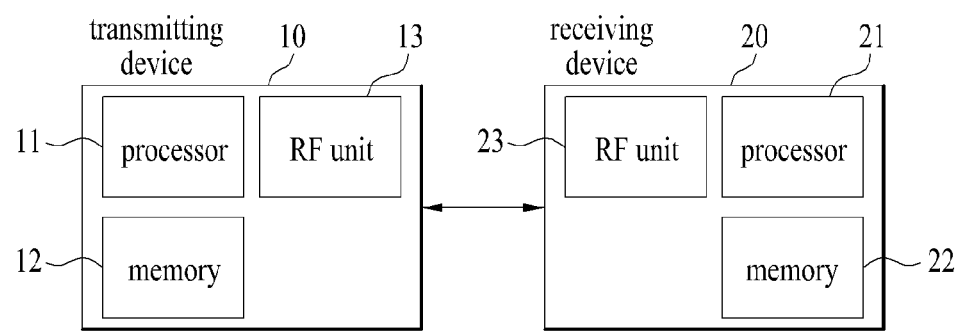
FIG. 8 is a block diagram of a device for transmitting and receiving a UL control channel according to an embodiment of the present invention.

FIG. 8 is a block diagram of a transmitting device 10 and a receiving device 20 configured to implement exemplary embodiments of the present invention. Referring to FIG. 8, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency downconverts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE or a relay node serves as the transmission device 10 in uplink and as the receiving device 20 in downlink. In embodiments of the present invention, a BS or an eNB serves as the receiving device 20 in uplink and as the transmission device 10 in downlink.

Hereinafter, for description of the embodiments of the present invention, the processor, the memory, and the RF unit, which are provided in the BS, may be referred to as BS processor, BS memory, and BS RF unit, and the processor, the memory, and the RF unit, which are provided in the UE, may be referred to as UE processor, UE memory, and UE RF unit. In the present invention, the BS processor may be the processor located in the BS, or may be a BS controller connected with the BS through a cable or dedicated line to control the BS.

The UE processor may be configured to determine the number of bits for phase information between points (inter-point phase information) belonging to the CoMP set and the number of bits for a channel quality indicator (CQI) for the CoMP set, based on rank indicator (RI) information within the number of bits allocated for transmission of the CSI. The number or bits for the inter-point phase information and the CQI may be controlled based on the RI information, the sum of the bits is fixed so that the CSI feedback is efficiently done without increase of overhead for the CSI. Further, although the sum of the bits may be flexibly configured according to other embodiments of the present application, more flexible CSI feedback structure can be provided for the CoMP set by dynamically controlling or determining the number of bits for the inter-point phase information and the CSI within the number of bits allocated for the CSI.

The UE processor may be configured to transmit the CSI including the inter-point phase information and the CQI for the CoMP set to at least one of the points belonging to the CoMP set according to the determined numbers of bits through the UE RF unit.

Also, the RI information may include an RI for the CoMP set and an RI for each of the points belonging to the CoMP set. Additionally, the RI information may include the relationship (for example, large or small) between the RI for the CoMP set and the RI for single point.

Further, the UE processor may be configured to report a precoding matrix indicator (PMI) for the CoMP set to at least one point belongs to the CoMP set. The UE processor may be configured to derive a precoding matrix index (PMI) for the CoMP set by concatenating PMIs for each of the points of the CoMP set, when an RI for the CoMP set is the same as an RI for each of the points of the CoMP set. The UE processor may be configured to pad a zero vector to a PMI for each of the points of the CoMP set and acquire the PMI for the CoMP set by concatenating the PMIs to which the zero vector is padded, when an RI for the CoMP set is greater than an RI for each of the points of the CoMP set. When the zero vector is padded, the UE processor may be configured to set the number of bits for the inter-point phase information to zero. Using the PMI deriving or acquiring scheme, PMI feedback and CQI feedback can be performed for the CoMP set.

When an RI for the CoMP set is 2 or more, the UE processor may be configured to set the number of bits for the inter-point phase information to zero. Depending on the state of the CoMP set, whether to allocate resources for additional information (that is, inter-point phase information) may be determined. In case that the inter-point phase information is not necessary or it does not affect report of the CSI a lot, it may be omitted.

According to aforementioned embodiment(s) of the present application, whether to provide the inter-point phase information according to rank information for the CoMP set or single point, or the number of bits allocated for the inter-point phase information (resolution) can be determined. Additionally, allocation of the number of bits regarding the CQI for the CoMP set can be determined so that more flexible CSI feedback for the CoMP set can be supported.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The present invention is applicable to a wireless communication device such as a user equipment (UE), relay, or base station (BS).

The invention claimed is:

1. A method for transmitting channel state information (CSI) for a coordinated multi-point transmission and reception (CoMP) set by a user equipment (UE) communicating with the CoMP set in a wireless communication system, the method comprising:
   determining the number of bits for inter-point phase information based on rank indicator (RI) information within the number of bits allocated for transmission of the CSI; and
   transmitting the CSI including the inter-point phase information to at least one of points belonging to the CoMP set,
   wherein when an RI for the CoMP set is greater than an RI for each of the points of the CoMP set, or when the RI for the CoMP set is 2 or more, the number of bits for the inter-point phase information is set to N, and
   wherein N is smaller than the number of bits for the inter-point phase information in a case that the RI for the CoMP set is 1.

2. The method according to claim 1, further comprising:
   determining the number of bits for a channel quality indicator (CQI) for the CoMP set based on the RI information within the number of bits allocated for transmission of the CSI, wherein when the RI for the CoMP set is 1, the number of bits for the CQI for the CoMP set is set to zero and the number of bits for each of CQIs for each of the points of the CoMP set is set to non-zero.

3. The method according to claim 1, further comprising: transmitting a precoding matrix indicator (PMI) for the CoMP set to at least one of the points belonging to the CoMP set.

4. The method according to claim 1, further comprising: deriving a precoding matrix index (PMI) for the CoMP set by concatenating PMIs for each of the points of the CoMP set, when the RI for the CoMP set is the same as the RI for each of the points of the CoMP set.

5. The method according to claim 1, further comprising: padding a zero vector to a precoding matrix index (PMI) for each of the points of the CoMP set and acquiring the PMI for the CoMP set by concatenating the PMIs to which the zero vector is padded, when the RI for the CoMP set is greater than the RI for each of the points of the CoMP set.

6. The method according to claim 5, wherein N is set to zero, when the zero vector is padded.

7. The method according to claim 1, wherein N is set to zero, when an RI for the CoMP set is 2 or more.

8. A method for receiving, by one of points belonging to a coordinated multi-point transmission and reception (CoMP) set, channel state information (CSI) for the CoMP set from a user equipment (UE) communicating with the CoMP set in a wireless communication system, the method comprising:
receiving the CSI including inter-point phase information; and
detecting the number of bits for the inter-point phase information based on rank indicator (RI) information within the number of bits allocated for the received CSI,
wherein when an RI for the CoMP set is greater than an RI for each of the points of the CoMP set, or when the RI for the CoMP set is 2 or more, the number of bits for the inter-point phase information is detected as N, and
wherein N is smaller than the number of bits for the inter-point phase information in a case that the RI for the CoMP set is 1.

9. A user equipment (UE) for communicating with a coordinated multi-point transmission and reception (CoMP) set and transmitting channel state information (CSI) for the CoMP set in a wireless communication system, the UE comprising:
a radio frequency (RF) unit configured to transmit or receive a radio signal; and
a processor configured to control the RF unit,
wherein the processor is further configured to:
determine the number of bits for inter-point phase information based on rank indicator (RI) information within the number of bits allocated for transmission of the CSI, and
transmit the CSI including the inter-point phase information to at least one of points belonging to the CoMP set,
wherein when an RI for the CoMP set is greater than an RI for each of the points of the CoMP set, or when the RI for the CoMP set is 2 or more, the number of bits for the inter-point phase information is set to N, and
wherein N is smaller than the number of bits for the inter-point phase information in a case that the RI for the CoMP set is 1.

10. The UE according to claim 9, wherein the processor is further configured to:
determine the number of bits for a channel quality indicator (COI) for the CoMP set based on the RI information within the number of bits allocated for transmission of the CSI,
wherein when an RI for the CoMP set is 1, the number of bits for the COI for the CoMP set is set to zero and the number of bits for each of CQIs for each of the points of the CoMP set is set to non-zero.

11. The UE according to claim 9, wherein the processor is configured to transmit a precoding matrix indicator (PMI) for the CoMP set to at least one of the points belonging to the CoMP set.

12. The UE according to claim 9, wherein the processor is configured to derive a precoding matrix index (PMI) for the CoMP set by concatenating PMIs for each of the points of the CoMP set, when the RI for the CoMP set is the same as the RI for each of the points of the CoMP set.

13. The UE according to claim 9, wherein the processor is configured to pad a zero vector to a recoding matrix indicator (PMI) for each of the points of the CoMP set and derive a PMI for the CoMP set by concatenating the PMI to which the zero vector is padded, when the RI for the CoMP set is greater than the RI for each of the points of the CoMP set.

14. The UE according to claim 13, wherein the processor is configured to set N to zero, when the zero vector is padded.

15. The UE according to claim 9, wherein the processor is configured to set N to zero, when the RI for the CoMP set is 2 or more.

16. A base station (BS) belonging to a coordinated multi-point transmission and reception (CoMP) set for receiving channel state information (CSI) for the CoMP set from a user equipment (UE) communicating with the CoMP set in a wireless communication system, the BS comprising:
a radio frequency (RF) unit configured to transmit or receive a radio signal; and
a processor configured to control the RF unit,
wherein the processor is further configured to:
receive the CSI including inter-point phase information, and
detect the number of bits for the inter-point phase information based on rank indicator (RI) information within the number of bits allocated for the received CSI,
wherein when an RI for the CoMP set is greater than an RI for each of points of the CoMP set, or when the RI for the CoMP set is 2 or more, the number of bits for the inter-point phase information is detected as N, and
wherein N is smaller than the number of bits for the inter-point phase information in a case that the RI for the CoMP set is 1.

* * * * *